United States Patent
Nozoe et al.

(10) Patent No.: US 11,831,011 B2
(45) Date of Patent: Nov. 28, 2023

(54) POSITIVE ELECTRODE MATERIAL FOR LITHIUM ION BATTERY, POSITIVE ELECTRODE FOR LITHIUM ION BATTERY, AND LITHIUM ION BATTERY

(71) Applicant: SUMITOMO OSAKA CEMENT CO., LTD., Tokyo (JP)

(72) Inventors: Tsutomu Nozoe, Chiba (JP); Toyomasa Nakano, Chiba (JP)

(73) Assignees: SUMITOMO METAL MINING CO., LTD., Tokyo (JP); SUMITOMO METAL MINING CO., LTD., Tokyo (JP)

( * ) Notice: Subject to any disclaimer, the term of this patent is extended or adjusted under 35 U.S.C. 154(b) by 213 days.

(21) Appl. No.: 17/480,496

(22) Filed: Sep. 21, 2021

(65) Prior Publication Data
US 2022/0320494 A1 Oct. 6, 2022

(30) Foreign Application Priority Data
Mar. 30, 2021 (JP) .................... 2021-058335

(51) Int. Cl.
*H01M 4/36* (2006.01)
*H01M 4/62* (2006.01)
(Continued)

(52) U.S. Cl.
CPC ........... *H01M 4/366* (2013.01); *H01M 4/625* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2012/0129052 A1* 5/2012 Bauer .................. H01M 4/364
977/734
2019/0305362 A1 10/2019 Nozoe et al.

FOREIGN PATENT DOCUMENTS

JP 2012-204322 A 10/2012
JP 5743011 B1 7/2015
(Continued)

OTHER PUBLICATIONS

EESR for EP App. No. 21198122.0, dated Feb. 25, 2022.
(Continued)

*Primary Examiner* — Wyatt P McConnell
(74) *Attorney, Agent, or Firm* — Greenblum & Bernstein, P.L.C.

(57) ABSTRACT

To provide a positive electrode material for a lithium ion battery from which a lithium ion battery capable of enhancing output characteristics at low temperatures can be obtained, a positive electrode for a lithium ion battery in which the positive electrode material for a lithium ion battery is used, and a lithium ion battery including the positive electrode for a lithium ion battery. A positive electrode material for a lithium ion battery consisting of primary particles coated with a carbonaceous film or an agglomerate of the primary particles, in which a powder resistance Y is 500 Ω·cm or more and 50000 Ω·cm or less, a mass X of the carbonaceous film per unit specific surface area is 0.7 mg/m² or more and 1.1 mg/m² or less, and Formula (1) below is satisfied.

$$Y \geq 4.91 \times 10^6 \times e^{-9.021X} \qquad (1)$$

5 Claims, 1 Drawing Sheet

(51) Int. Cl.
*H01M 10/0525* (2010.01)
*H01M 4/02* (2006.01)

(56) References Cited

FOREIGN PATENT DOCUMENTS

| | | |
|---|---|---|
| JP | 2016-149295 A | 8/2016 |
| JP | 2017-69177 A | 4/2017 |
| JP | 6288338 B1 | 3/2018 |
| JP | 6627932 B1 | 1/2020 |
| WO | WO 2010/073634 A1 | 7/2010 |

OTHER PUBLICATIONS

Office Action for EP App. No. 21198122.0, dated May 10, 2023.
Kim et al., "Comparison of structural characteristics and electrochemical properties of $LIMPO_4$ (M=Fe, Mn, and Co) olivine compounds", Materials Letters, 176:244-247 (2016).

* cited by examiner

POSITIVE ELECTRODE MATERIAL FOR LITHIUM ION BATTERY, POSITIVE ELECTRODE FOR LITHIUM ION BATTERY, AND LITHIUM ION BATTERY

BACKGROUND OF THE INVENTION

Field of the Invention

The present invention relates to a positive electrode material for a lithium ion battery, a positive electrode for a lithium ion battery, and a lithium ion battery.

Description of Related Art

For batteries, there are a variety of required characteristics, and studies are underway regarding improvement in such characteristics.

For example, Japanese Patent No. 6288338 discloses that, in order to suppress peeling of carbonaceous films that coat the surfaces of the primary particles of a positive electrode active material and to improve the positive electrode density while guaranteeing the electron conductivity, as a positive electrode material for a lithium ion secondary battery, a positive electrode material for a lithium ion secondary battery that is active material particles including central particles represented by a predetermined chemical composition and carbonaceous films that coat the surfaces of the central particles, in which a coarse particle ratio in the particle size distribution is 35% or more and 65% or less, and a median diameter of the active material particles is 0.50 μm or more and 0.80 μm or less is used.

In addition, for example, Japanese Patent No. 6627932 discloses that, in order to suppress deterioration of the durability of an electrode that is accompanied by elution of metal from a positive electrode material and to obtain a lithium ion secondary battery having both high input/output characteristics and favorable cycle characteristics, as a positive electrode material for a lithium ion secondary battery, a positive electrode material for a lithium ion secondary battery including agglomerated particles that are agglomerates of a plurality of the primary particles of a positive electrode active material represented by a predetermined chemical composition coated with carbonaceous films, in which the amount of carbon per crystallite diameter of the positive electrode active material is 0.0084% by mass/nm or more 0.0358% by mass/nm or less, a peak intensity ratio ($I_D/I_G$) between a D band and a G band of a Raman spectrum obtained by Raman spectrometry is 0.85 or more and 1.15 or less, a particle diameter (D10) at a cumulative percentage of 10% in a cumulative particle size distribution is 1 μm or more and 5 μm or less, and a particle diameter (D90) at a cumulative percentage of 90% is 15 μm or less is used.

Furthermore, for example, Japanese Patent No. 5743011 discloses that, in order to obtain an electrode material capable of suppressing voltage drop at the time of carrying out high-speed discharging in a low-temperature environment, as the electrode material, a particulate electrode material obtained by forming carbonaceous films on the surfaces of electrode active material particles having an olivine-type crystal structure, in which the average of the discharge capacity ratios between a 35 C discharge capacity of a single particle of the electrode material at −10° C. and a 1 C discharge capacity of the single particle of the electrode material at −10° C. is 0.50 or more, and an XRD (CuKα ray source) peak of a (002) plane attributed to a graphene layer in the carbonaceous film appears at 2θ=25.7° or less is used.

SUMMARY OF THE INVENTION

Output characteristics at low temperatures are one of the required characteristics of batteries. In lithium iron phosphate coated with carbon, since lithium ions are intercalated and deintercalated through gaps among carbon clusters, when lithium iron phosphate is coated with carbon such that only the migration of electrons become easy, there has been a problem in that it becomes difficult for lithium ions to pass through gaps among carbon clusters and characteristics at low temperatures become poor.

The carbonaceous films that are used in the positive electrode materials described in Japanese Patent No. 6288338 and Japanese Patent No. 6627932 are graphene-like carbon and are thus not excellent in terms of low temperature characteristics. In addition, the carbonaceous film that is used in the electrode material described in Japanese Patent No. 5743011 has a graphene shape, but is an irregular carbon coat, and there is room for additional studies.

The present invention has been made in view of such circumstances, and an object of the present invention is to provide a positive electrode material for a lithium ion battery from which a lithium ion battery capable of enhancing output characteristics at low temperatures can be obtained, a positive electrode for a lithium ion battery in which the positive electrode material for a lithium ion battery is used, and a lithium ion battery including the positive electrode for a lithium ion battery.

<1> A positive electrode material for a lithium ion battery consisting of primary particles coated with a carbonaceous film or an agglomerate of the primary particles, in which a powder resistance is 500 Ω·cm or more and 50000 Ω·cm or less, a mass of the carbonaceous film per unit specific surface area is 0.7 mg/m² or more and 1.1 mg/m² or less, and Formula (1) is satisfied.

$$Y \geq 4.91 \times 10^6 \times e^{-9.021X} \quad (1)$$

Y: Powder resistance (Ω·cm)
X: Mass of carbonaceous film per unit specific surface area (mg/m²)

<2> The positive electrode material for a lithium ion battery according to <1>, in which a main component of the carbonaceous film is consisted of hard carbon.

<3> The positive electrode material for a lithium ion battery according to <1> or <2>, in which a thickness of the carbonaceous film is 0.5 nm or more and 10 nm or less.

<4> A positive electrode for a lithium ion battery, in which the positive electrode material for a lithium ion battery according to any one of <1> to <3> is used.

<5> A lithium ion battery including the positive electrode for a lithium ion battery according to <4>.

According to the present invention, it is possible to provide a positive electrode material for a lithium ion battery from which a lithium ion battery capable of enhancing output characteristics at low temperatures can be obtained, a positive electrode for a lithium ion battery in which the positive electrode material for a lithium ion battery is used, and a lithium ion battery including the positive electrode for a lithium ion battery.

DETAILED DESCRIPTION OF THE INVENTION

Positive Electrode Material for Lithium Ion Battery

A positive electrode material for a lithium ion battery of the present embodiment is consisted of primary particles coated with a carbonaceous film or an agglomerate of the primary particles, in which a powder resistance is 500 Ω·cm or more and 50000 Ω·cm or less, a mass of the carbonaceous film per unit specific surface area is 0.7 mg/m² or more and 1.1 mg/m² or less, and Formula (1) below is satisfied.

$$Y \geq 4.91 \times 10^6 \times e^{-9.021X} \quad (1)$$

Y: Powder resistance (Ω·cm)

X: Mass of carbonaceous film per unit specific surface area (mg/m²)

Hereinafter, the positive electrode material for a lithium ion battery will be simply referred to as "positive electrode material" in some cases.

In the positive electrode material for a lithium ion battery of the present embodiment, electrode active material particles are coated with carbonaceous films, and the electrode active material particles are made of primary particles and secondary particles that are agglomerates of the primary particles. Hereinafter, an electrode active material coated with the carbonaceous film will be referred to as a carbonaceous coated electrode active material in some cases.

The details of a method for manufacturing the carbonaceous coated electrode active material will be described below; however, usually, the electrode active material is coated with a carbonaceous film that is close to a lamellar graphene structure by carbonization of a carbon source that is attached to the surface layers of the electrode active material particles as it is. In the present invention, it was possible to obtain an electrode active material coated with predetermined porous carbon by adjusting the method for applying the carbon source, the atmosphere at the time of calcinating the carbon source, and the calcination time. As a result of analyzing such a carbonaceous coated electrode active material from the viewpoint of the powder resistance and the mass of a carbonaceous film per unit specific surface area, it was found that the output characteristics at low temperatures (for example, −30° C.) of lithium ion batteries can be enhanced by constituting the present invention as described above.

Powder Resistance

In the positive electrode material for a lithium ion battery of the present embodiment, the powder resistance is 500 Ω·cm or more and 50000 Ω·cm or less.

When the powder resistance is less than 500 Ω·cm, the carbon structure becomes a graphite-like structure, micropores for the intercalation and deintercalation of lithium ion become small, and the capacity at low temperatures decreases. In addition, when the powder resistance exceeds 50000 Ω·cm, it is not possible to hold the electron conductivity on the surface of the active material.

The powder resistance is preferably 700 Ω·cm or more and 48000 Ω·cm or less, more preferably 800 Ω·cm or more and 46000 Ω·cm or less, and still more preferably 900 Ω·cm or more and 44000 Ω·cm or less.

The powder resistance value can be measured from a sample obtained by molding the positive electrode material at a pressure of 50 MPa, and specifically, can be measured by a method described in examples.

Mass of Carbonaceous Film Per Unit Specific Surface Area

In the positive electrode material for a lithium ion battery of the present embodiment, the mass of a carbonaceous film per unit specific surface area is 0.7 mg/m² or more and 1.1 mg/m² or less.

When the mass of the carbonaceous film per unit specific surface area is less than 0.7 mg/m², it is not possible to hold the electron conductivity, and, when the mass of the carbonaceous film per unit specific surface area exceeds 1.1 mg/m², the carbonaceous film serves as a resistance to the intercalation and deintercalation of lithium ions, and the characteristics at low temperatures deteriorate.

The mass of the carbonaceous film per unit specific surface area is preferably 0.705 mg/m² or more and 1.095 mg/m² or less, more preferably 0.71 mg/m² or more and 1.09 mg/m² or less, and still more preferably 0.71 mg/m² or more and 1.08 mg/m² or less.

The mass of the carbonaceous film per unit specific surface area can be calculated from the specific surface area of the positive electrode material and the mass of the carbonaceous film to be described below.

Electrode Active Material

The shape of the electrode active material particle is not particularly limited, but is preferably spherical, particularly, truly spherical. When the electrode active material particle is spherical, internal micropores of a granulated granular body (carbonaceous coated electrode active material) are likely to be uniform, and a favorable electrolyte holding capability is developed. In addition, when the electrode active material particles are made into a granular body, it is possible to reduce the amount of a solvent at the time of preparing a paste for forming an electrode using the positive electrode material for a lithium ion battery of the present embodiment, and the application of the paste for forming an electrode to a current collector also becomes easy. The paste for forming an electrode can be prepared by, for example, mixing the positive electrode material for a lithium ion battery of the present embodiment, a binder resin (a binder), and a solvent.

The electrode active material that is used in the positive electrode material for a lithium ion battery of the present embodiment is preferably an electrode active material represented by General Formula (1) below from the viewpoint of a high discharge capacity, a high energy density, safety, and cycle stability.

$$Li_aA_xM_yBO_z \quad (1)$$

(In the formula, A is at least one element selected from the group consisting of Mn, Fe, Co, and Ni, M is at least one element selected from the group consisting of Na, K, Mg, Ca, Al, Ga, Ti, V, Cr, Cu, Zn, Y, Zr, Nb, Mo and rare earth elements, B is at least one element selected from the group consisting of B, P, Si and S, 0≤a<4, 0<x<1.5, 0≤y<1, and 0<z≥4.)

In the formula, A is at least one element selected from the group consisting of Mn, Fe, Co, and Ni, among them, Mn and Fe are preferable, and Fe is more preferable.

M is at least one element selected from the group consisting of Na, K, Mg, Ca, Al, Ga, Ti, V, Cr, Cu, Zn, Y, Zr, Nb, Mo and rare earth elements, among them, Mg, Ca, Al, and Ti are preferable.

B is at least one element selected from the group consisting of B, P, Si, and S, among them, P is preferable from the viewpoint of excellent safety and excellent cycle characteristics.

a is 0 or more and less than 4, preferably 0.5 or more and 3 or less, more preferably 0.5 or more and 2 or less, and particularly preferably 1. x is more than 0 and less than 1.5, preferably 0.5 or more and 1 or less, and particularly preferably 1. y is 0 or more and less than 1 and preferably 0 or more and 0.1 or less. z is more than 0 and 4 or less and is selected according to the composition of B. For example, in a case where B is phosphorus (P), z is preferably 4, and, in a case where B is boron (B), z is preferably 3.

The electrode active material represented by General Formula (1) preferably has an olivine structure, more preferably an electrode active material represented by General Formula (2) below, and more preferably LiFePO$_4$ and Li(Fe$_{x1}$Mn$_{1-x1}$)PO$_4$ (here, 0<x1<1), which is the LiFePO$_4$ in which some of Fe is substituted with Mn.

$$Li_aA_xM_yPO_4 \quad (2)$$

(In the formula, A, M, a, x, and y are as described above.)

As the electrode active material (Li$_a$A$_x$M$_y$BO$_z$) represented by General Formula (1), it is possible to use an electrode active material manufactured by a conventional method such as a solid phase method, a liquid phase method, a gas phase method or the like.

Li$_a$A$_x$M$_y$BO$_z$ can be obtained by, for example, hydrothermally synthesizing a slurry-form mixture that is obtained by mixing a Li source, an A source, an M source, a B source, and water and washing an obtained precipitate with water. In addition, the same electrode active material can also be obtained by generating an electrode active material precursor by hydrothermal synthesis and further calcinating the electrode active material precursor. A pressure-resistant airtight container is preferably used in the hydrothermal synthesis.

Here, examples of the Li source include lithium salts such as lithium acetate (LiCH$_3$COO), lithium chloride (LiCl), and the like and lithium hydroxide (LiOH) and the like, and at least one selected from the group consisting of lithium acetate, lithium chloride, and lithium hydroxide is preferably used.

Examples of the A source include chlorides, carboxylates, hydrosulfates, and the like containing at least one element selected from the group consisting of Mn, Ni, Fe, Co, and Ni. For example, in a case where the A source is Fe, examples of a Fe source include divalent iron salts such as iron (II) chloride (FeCl$_2$), iron (II) acetate (Fe(CH$_3$COO)$_2$), and iron (II) sulfate (FeSO$_4$), and at least one selected from the group consisting of iron (II) chloride, iron (II) acetate, and iron (II) sulfate is preferably used.

Similarly, as the M source, chlorides, carboxylates, hydrosulfates, and the like of Na, K, Mg, Ca, Al, Ga, Ti, V, Cr, Cu, Zn, Y, Zr, Nb, Mo, and a rare earth element can be used.

Examples of the B source include compounds containing at least one element selected from the group consisting of B, P, Si, and S. For example, in a case where the B source is P, examples of a P source include phosphoric acid (H$_3$PO$_4$) and phosphoric acid compounds such as ammonium dihydrogen phosphate (NH$_4$H$_2$PO$_4$), diammonium hydrogen phosphate ((NH$_4$)$_2$HPO$_4$), and the like, and at least one selected from the group consisting of phosphoric acid, ammonium dihydrogen phosphate, and diammonium hydrogen phosphate is preferably used.

The substance amount ratio (Li:A:M:B) of the Li source, the A source, the M source, and the B source is appropriately selected so that a desired electrode active material can be obtained and impurities are not generated.

The crystallite diameter of the electrode active material is preferably 30 nm or more and 250 nm or less, more preferably 35 nm or more and 250 nm or less, and still more preferably 40 nm or more and 200 nm or less. When the crystallite diameter is 30 nm or more, since the amount of carbon required to sufficiently cover the surface of the electrode active material with the carbonaceous film is suppressed, and the amount of the binder can be suppressed, it is possible to increase the amount of the electrode active material in electrodes and to increase the capacity of batteries. Similarly, it is possible to make peeling of the film attributed to an insufficient binding force less likely to occur. When the crystallite diameter is 250 nm or less, the internal resistance of the electrode active material is suppressed, and, in a case where a battery has been formed, it is possible to increase the discharge capacity at a high charge-discharge rate.

The crystallite diameter is measured with an X-ray diffractometer (for example, RINT2000, manufactured by Rigaku Corporation) and can be calculated from the Scherrer's formula using the full width at half maximum and the diffraction angle (2θ) of the diffraction peak of a (020) plane of the obtained powder X-ray diffraction pattern.

Carbonaceous Film

The carbonaceous film that coats the primary particles of the electrode active material and the secondary particle, which are agglomerates of the primary particles is obtained by carbonizing an organic substance that serves as a raw material of the carbonaceous film.

Examples of the organic substance include an ionic organic substance, a non-ionic organic substance, and the like.

Ionic Organic Substance

Examples of the ionic organic substance include sugars, polyacrylic acids, polystyrene sulfonic acids, polycarboxylic acid-based polymers, alkylbenzene sulfonates, alkyl sulfates, salts of carboxylic acid-modified polyvinyl alcohol, salts of sulfonic acid-modified polyvinyl alcohol, polycarboxylates, polyacrylates, polymethacrylates, ionic surfactants, and the like.

Non-Ionic Organic Substance

As the non-ionic organic substance, for example, polyvinyl alcohol (PVA), polyvinyl pyrrolidone, polyacrylamide, polyvinyl acetate, a polyether, a dihydric alcohol, a trihydric alcohol, a non-ionic surfactant, or the like can be preferably used.

These organic substances may be used singly or two or more organic substances may be mixed and used.

In order to easily mix the organic substance and the electrode active material particles and to obtain the coating of a uniform carbonaceous film, the organic substance to be used is preferably soluble in solvents and more preferably water-soluble from the viewpoint of easiness in handling, safety, cost, and the like.

The main component of the carbonaceous film is preferably consisted of hard carbon from the viewpoint of improving the output characteristics of lithium ion batteries at low temperatures. Here, the main component means that the mass of hard carbon in the carbonaceous film exceeds 50% by mass, and the mass of hard carbon is preferably 70% by mass or more, more preferably 90% by mass or more, and still more preferably 97% by mass or more.

Hard carbon is also referred to as non-graphitizable carbon, is a carbon in which a graphite crystal structure does not easily develop even when heated at high temperatures, and has a porous structure.

From the viewpoint of easiness in containing hard carbon as the main component of the carbonaceous film, as the organic substance, the non-ionic organic substance is preferable, one or more selected from the group consisting of polyvinyl alcohol (PVA), polyvinyl pyrrolidone, and polyacrylamide is more preferable, and polyvinyl alcohol (PVA) is still more preferably contained.

The method for containing hard carbon as the main component of the carbonaceous film will be described in the section of a method for manufacturing a positive electrode material for a lithium ion battery to be described below.

The average particle diameter of the primary particles of the electrode active material coated with the carbonaceous film (carbonaceous coated electrode active material) is preferably 30 nm or more and 250 nm or less, more preferably 50 nm or more and 200 nm or less, still more preferably 50 nm or more and 150 nm or less, and far still more preferably 60 nm or more and 100 nm or less. When the average particle diameter is 30 nm or more, it is possible to reduce the amount of the binder required for the production of electrodes and to increase the capacity of batteries by increasing the amount of the electrode active material in the electrodes. In addition, it is possible to suppress peeling of the film attributed to an insufficient binding force. On the other hand, when the average particle diameter is 250 nm or less, it is possible to obtain sufficient high-speed charge and discharge performance.

Here, the average particle diameter of the primary particles refers to the number-average particle diameter. The average particle diameter of the primary particles can be obtained by number-averaging the particle diameters of 200 or more particles measured by scanning electron microscopic (SEM) observation.

The average particle diameter of the secondary particles of the carbonaceous coated electrode active material is preferably 0.5 μm or more and 200 μm or less, more preferably 1 μm or more and 150 μm or less, and still more preferably 3 μm or more and 100 μm or less. When the average particle diameter of the secondary particles is 0.5 μm or more, it is possible to suppress the necessity of a large amount of a conductive auxiliary agent and a binder at the time of preparing a positive electrode material paste for a lithium ion battery by mixing the positive electrode material for a lithium ion battery, the conductive auxiliary agent, a binder resin (binder), and a solvent. Therefore, it is possible to increase the battery capacity of lithium ion batteries. On the other hand, when the average particle diameter of the secondary particles is 200 μm or less, it is possible to increase the discharge capacity of lithium ion batteries in high-speed charge and discharge.

Here, the average particle diameter of the secondary particles refers to the volume-average particle diameter. The average particle diameter of the secondary particles can be measured using a laser diffraction and scattering particle size distribution measurement instrument or the like.

The thickness (average value) of the carbonaceous film that coats the electrode active material particles is preferably 0.5 nm or more and 10 nm or less, more preferably 0.8 nm or more and 8 nm or less, still more preferably 0.8 nm or more and 8 nm or less, and far still more preferably 0.8 nm or more and 5 nm or less. When the thickness of the carbonaceous film is 0.5 nm or more, it is possible to suppress an increase in the sum of the migration resistances of electrons in the carbonaceous film. Therefore, it is possible to suppress an increase in the internal resistance of lithium ion batteries and prevent voltage drop at a high charge-discharge rate. On the other hand, when the thickness of the carbonaceous film is 10 nm or less, it is possible to suppress the formation of a steric barrier that inhibits the diffusion of lithium ions in the carbonaceous film, which decreases the migration resistance of lithium ions. As a result, an increase in the internal resistance of the battery is suppressed, and it is possible to prevent voltage drop at a high charge-discharge rate.

The thickness of the carbonaceous film can be obtained by photographing the carbonaceous coated electrode active material using a transmission electron microscope (TEM) or a scanning electron microscope (SEM), measuring the thickness of the carbonaceous film at 100 points from the obtained cross-sectional image, and obtaining the average value.

The coating ratio of the carbonaceous film to the electrode active material particles is preferably 60% or more and more preferably 80% or more. When the coating ratio of the carbonaceous film is 60% or more, the coating effect of the carbonaceous film can be sufficiently obtained.

The coating ratio of the carbonaceous film can be obtained by observing the carbonaceous coated electrode active material using a transmission electron microscope (TEM), an energy dispersive X-ray microanalyzer (EDX), or the like, calculating the proportion of parts in which the carbonaceous film covers the surface of the electrode active material, and obtaining the average value thereof.

The density of the carbonaceous film is preferably 0.2 $g/cm^3$ or more and 2 $g/cm^3$ or less and more preferably 0.5 $g/cm^3$ or more and 1.5 $g/cm^3$ or less. The density of the carbonaceous film refers to the mass per unit volume of the carbonaceous film.

When the density of the carbonaceous film is 0.2 $g/cm^3$ or more, the carbonaceous film is capable of exhibiting sufficient electron conductivity. On the other hand, when the density of the carbonaceous film is 2 $g/cm^3$ or less, since the amount of graphite crystals having a lamellar structure in the carbonaceous film is small, the fine graphite crystals do not build any steric barrier during the diffusion of lithium ions in the carbonaceous film. Therefore, the lithium ion migration resistance does not increase. As a result, the internal resistance of lithium ion batteries does not increase, and voltage drop at a high charge-discharge rate of lithium ion batteries does not occur.

The amount of carbon of the positive electrode material for a lithium ion battery of the present embodiment (the carbon content that is contained in the positive electrode material for a lithium ion battery) is considered to be the same as the mass of the carbonaceous film in the positive electrode material and is preferably 0.5% by mass or more and 3.5% by mass or less, more preferably 0.8% by mass or more and 2.5% by mass or less, and still more preferably 0.8% by mass or more and 2.2% by mass or less. When the amount of carbon is 0.5% by mass or more, it is possible to sufficiently increase the electron conductivity. On the other hand, when the amount of carbon is 3.5% by mass or less, it is possible to increase the electrode density.

The amount of carbon can be measured using a carbon analyzer (for example, manufactured by Horiba, Ltd., carbon/sulfur analyzer: EMIA-220V).

The specific surface area of the positive electrode material for a lithium ion battery of the present embodiment is preferably 4 $m^2/g$ or more and 40 $m^2/g$ or less, more preferably 8 $m^2/g$ or more and 28 $m^2/g$ or less, still more preferably 10 $m^2/g$ or more and 25 $m^2/g$ or less, and far still more preferably 11 $m^2/g$ or more and 22 $m^2/g$ or less.

When the specific surface area is 4 $m^2/g$ or more, it is possible to develop sufficient high-speed charge and discharge performance. On the other hand, when the specific surface area is 40 $m^2/g$ or less, since it is possible to constitute electrodes without containing a large amount of a binder and a conductive auxiliary agent, it is possible to suppress a decrease in the capacity of batteries.

The specific surface area can be measured by a nitrogen ($N_2$) adsorption method using a gas adsorption measuring instrument (for example, manufactured by Mountech Co., Ltd., trade name: HM model-1208).

Method for Manufacturing Positive Electrode Material for Lithium Ion Battery

A method for manufacturing the positive electrode material for a lithium ion battery of the present embodiment has a first step of drying a slurry obtained by mixing an organic substance that serves as a carbon source, one or more selected from an electrode active material and an electrode active material precursor, and a solvent using a spray dryer and granulating the mixture and a second step of thermally treating (calcinating) the granulated substance obtained in the first step in a superheated steam atmosphere for 0.5 to 24 hours.

In a positive electrode material that is obtained by drying and granulating a slurry for which an organic substance is used as a carbon source and one or more selected from an electrode active material and an electrode active material precursor and a solvent are mixed and thermally treating (calcinating) the slurry in a superheated steam atmosphere for 0.5 to 24 hours, it is easy to set the powder resistance and the mass of a carbonaceous film per unit specific surface area to the above-described ranges, and the requirement of Formula (1) is easily satisfied. In addition, the present manufacturing method makes it easy to form a carbonaceous film made of hard carbon as a main component.

First Step

The present step is a step of drying and granulating a slurry obtained by mixing an organic substance that serves as a carbon source, one or more selected from an electrode active material and an electrode active material precursor, and a solvent using a spray dryer.

First, the organic substance and one or more selected from an electrode active material and an electrode active material precursor are dissolved or dispersed in the solvent to prepare a mixture.

The method for applying the organic substance to one selected from an electrode active material and an electrode active material precursor and dissolving or dispersing the organic substance in the solvent is not particularly limited, and, for example, a dispersion device such as a planetary ball mill, an oscillation ball mill, a bead mill, a paint shaker, an attritor, or the like can be used.

Among them, from the viewpoint of improving the output characteristics of lithium ion batteries at low temperatures, the organic substance, one or more selected from an electrode active material and an electrode active material precursor, and the solvent are preferably mixed with a bead mill and more preferably mixed with a bead mill in which zirconia beads having diameters of 0.05 to 0.5 mm are used.

The organic substance, the electrode active material, and the electrode active material precursor are as described above, and, from the viewpoint of constituting the main component of the carbonaceous film with hard carbon, the organic substance is preferably a non-ionic organic substance, more preferably contains one or more selected from the group consisting of polyvinyl alcohol (PVA), polyvinyl pyrrolidone, and polyacrylamide, and still more preferably contains polyvinyl alcohol (PVA).

Examples of the solvent include water; alcohols such as methanol, ethanol, 1-propanol, 2-propanol (isopropyl alcohol: IPA), butanol, pentanol, hexanol, octanol, diacetone alcohol, and the like; esters such as ethyl acetate, butyl acetate, ethyl lactate, propylene glycol monomethyl ether acetate, propylene glycol monoethyl ether acetate, γ-butyrolactone, and the like; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, diethylene glycol monoethyl ether, and the like; ketones such as acetone, methyl ethyl ketone (MEK), methyl isobutyl ketone (MIBK), acetyl acetone, cyclohexanone, and the like; amides such as dimethyl formamide, N,N-dimethylacetoacetamide, N-methyl pyrrolidone, and the like; glycols such as ethylene glycol, diethylene glycol, propylene glycol, and the like, and the like. These solvents may be used singly or two or more solvents may be mixed and used. Among these solvents, a preferred solvent is water.

A dispersant may be added thereto as necessary.

The blending ratio between the organic substance and one or more selected from the electrode active material and the electrode active material precursor is preferably 0.5 parts by mass or more and 10 parts by mass or less with respect to 100 parts by mass of an active material that is obtained from one or more selected from the electrode active material and the electrode active material precursor in terms of the mass of carbon that is obtained from the organic substance. The actual amount blended varies depending on the amount of carbonization by heating and carbonization (the kind of the carbon source, carbonization conditions, and the like), but is generally approximately 1 part by mass to 8 parts by mass.

In addition, at the time of dissolving or dispersing the organic substance and one or more selected from the electrode active material and the electrode active material precursor in the solvent, it is preferable to disperse one or more selected from the electrode active material and the electrode active material precursor in the solvent and then add and stir the organic substance.

Next, the obtained slurry is dried using a spray dryer and granulated, whereby a granulated substance can be obtained.

Second Step

The present step is a step of thermally treating (calcinating) the granulated substance obtained in the first step in a superheated steam atmosphere for 0.5 to 24 hours.

When the granulated substance is thermally treating (calcinated) in a superheated steam atmosphere for 0.5 to 24 hours, it is easy to contain hard carbon as the main component of the carbonaceous film. When the heating atmosphere is, for example, an inert atmosphere such as nitrogen ($N_2$), argon (Ar), or the like, hard carbon is less likely to be generated.

In addition, when the thermal treatment time is 0.5 to 24 hours, the granulated substance is appropriately calcinated, and hard carbon is likely to be generated from the organic substance.

The thermal treatment time is preferably 0.8 to 10 hours, more preferably 1 to 6 hours, and still more preferably 1 to 3 hours.

The thermal treatment temperature is usually 600° C. or higher and 1000° C. or lower, preferably 650° C. or higher and 900° C. or lower, more preferably 700° C. or higher and 850° C. or lower, and still more preferably 700° C. or higher and 800° C. or lower.

When the thermal treatment temperature is 600° C. or higher, it is easy to sufficiently carbonize the organic substance, and the electron conductivity can be enhanced. When the thermal treatment temperature is 1000° C. or lower, the electrode active material particles are less likely to be demade, and it is easy to suppress particles growth.

According to the manufacturing method of the present embodiment, the organic substance is used as a precursor of the carbonaceous film, which enhances coatability. Since this makes it possible to suppress the electrode active material particles coming close to each other, it is possible to easily obtain a fine and highly reactive positive electrode material for a lithium ion battery coated with a carbonaceous material having higher electron conductivity without excessively containing carbon, and furthermore, it is possible to produce a granulated body that is excellent in terms of the permeability and holding capability of electrolytes and has an appropriate micropore size distribution. A positive electrode material for a lithium ion battery obtained as described above is capable of increasing the electrode density and is capable of forming lithium ion batteries having excellent output characteristics at low temperatures.

In addition, the positive electrode material for a lithium ion battery of the present embodiment has a large specific surface area and small particle diameters and thus exhibits favorable reactivity, particularly, in charge migration reactions on the surfaces of the electrode active material particles and reactions at low temperatures in which ion diffusivity inside the electrode active material particles deteriorates.

The manufacturing method of the present embodiment is applicable regardless of the kind of the electrode active material, but is particularly effective as a method for manufacturing a positive electrode material for an olivine-type phosphate-based lithium ion battery, having low electron conductivity at low costs with low environmental burdens.

Positive Electrode for Lithium Ion Battery

A positive electrode for a lithium ion battery of the present embodiment is made using the positive electrode material for a lithium ion battery of the present embodiment.

In order to produce the positive electrode for a lithium ion battery of the present embodiment, the above-described positive electrode material for a lithium ion battery, a binder made of a binder resin, and a solvent are mixed to prepare a coating material for forming the electrode or a paste for forming the electrode. At this time, a conductive auxiliary agent such as carbon black, acetylene black, graphite, ketjen black, natural graphite, artificial graphite, or the like may be added thereto as necessary.

As the binder, that is, the binder resin, for example, a polytetrafluoroethylene (PTFE) resin, a polyvinylidene fluoride (PVdF) resin, fluorine rubber, or the like is preferably used.

The blending ratio of the binder resin to the positive electrode material for a lithium ion battery is not particularly limited; however, the amount of the binder resin is set to 1 part by mass or more and 30 parts by mass or less and preferably set to 3 parts by mass or or more and 20 parts by mass or less with respect to 100 parts by mass of the positive electrode material for a lithium ion battery.

The solvent that is used for the coating material for forming the electrode or the paste for forming the electrode may be appropriately selected in accordance with properties of the binder resin.

Examples of the solvent include water; alcohols such as methanol, ethanol, 1-propanol, 2-propanol (isopropyl alcohol: IPA), butanol, pentanol, hexanol, octanol, diacetone alcohol, and the like; esters such as ethyl acetate, butyl acetate, ethyl lactate, propylene glycol monomethyl ether acetate, propylene glycol monoethyl ether acetate, γ-butyrolactone, and the like, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, diethylene glycol monoethyl ether, and the like, ketones such as acetone, methyl ethyl ketone (MEK), methyl isobutyl ketone (MIBK), acetyl acetone, cyclohexanone, and the like, amides such as dimethyl formamide, N,N-dimethylacetoacetamide, N-methyl pyrrolidone (NMP), and the like, glycols such as ethylene glycol, diethylene glycol, propylene glycol, and the like, and the like. These solvents may be used singly or two or more solvents may be mixed and used.

Next, the coating material for forming the electrode or the paste for forming the electrode is applied to one surface of a metal foil and then dried, thereby obtaining a metal foil in which a coated film made of the mixture of the positive electrode material for a lithium ion battery and the binder resin is formed on one surface.

Next, the coated film is pressurized, bonded by pressure, and dried, thereby producing a current collector (electrode) having a positive electrode material layer for a lithium ion battery on one surface of the metal foil.

An electrode having excellent output characteristics at low temperatures can be produced as described above.

Lithium Ion Battery

A lithium ion battery of the present embodiment includes the positive electrode for a lithium ion battery of the present embodiment. Therefore, the lithium ion battery of the present embodiment is capable of enhancing the output characteristics at low temperatures.

In the lithium ion battery of the present embodiment, a negative electrode, an electrolyte, a separator, and the like are not particularly limited. For example, as the negative electrode, it is possible to use a negative electrode material such as metallic Li, a carbon material, a Li alloy, $Li_4Ti_5O_{12}$. In addition, instead of the electrolyte and the separator, a solid electrolyte may be used.

EXAMPLES

Hereinafter, the present invention will be specifically described using examples and comparative examples. It should be noted that the present invention is not limited to forms described in the examples.

Manufacturing Example 1: Manufacturing of Electrode Active Material ($LiFePO_4$)

The synthesis of $LiFePO_4$ was carried out by hydrothermal synthesis as described below.

LiOH was used as a Li source, $NH_4H_2PO_4$ was used as a P source, and $FeSO_4 \cdot 7H_2O$ was used as a Fe source. These were mixed into pure water such that the ratio of the amounts of the materials (Li:Fe:P) reached 3:1:1, thereby preparing 200 mL of a homogeneous slurry-form mixture.

Next, this mixture was put into a pressure-resistant airtight container having a volume of 500 mL and was hydrothermally synthesized at 170° C. for 12 hours. After this reaction, the mixture was cooled to room temperature (25° C.), thereby obtaining a reaction product in a precipitated cake state. This precipitate was sufficiently washed with distilled water a plurality of times, and the water content was maintained at 30% to prevent the precipitate from being dried, thereby producing a cake-like substance. As a result of measuring powder obtained by collecting a small amount of this cake-like substance and drying the cake-like substance in a vacuum at 70° C. for 2 hours with an X-ray diffractometer (trade name: RINT2000, manufactured by Rigaku Corporation), it was confirmed that single-phase $LiFePO_4$ was formed.

Example 1

20 g of $LiFePO_4$ (electrode active material) obtained in the manufacturing example and 0.73 g of polyvinyl alcohol as a carbon source were mixed into water such that the total amount reached 100 g, and bead milling was carried out together with 150 g of zirconia beads having a diameter of 0.1 mm, thereby obtaining a slurry (mixture) in which the dispersed particle diameter (d50) reached 100 nm.

After that, the mixture was dried and granulated using a spray dryer at a temperature at which the drying outlet temperature reached 60° C. The granulated powder was thermally treated at 700° C. for 1 hour using a tubular furnace and a rotary kiln in a superheated steam atmosphere, thereby obtaining a positive electrode material made of a carbonaceous coated electrode active material.

Example 2

A positive electrode material made of a carbonaceous coated electrode active material was obtained in the same manner as in Example 1 except that the amount of polyvinyl alcohol was set to 0.80 g.

Example 3

A positive electrode material made of a carbonaceous coated electrode active material was obtained in the same manner as in Example 1 except that the amount of polyvinyl alcohol was set to 0.87 g.

Example 4

A positive electrode material made of a carbonaceous coated electrode active material was obtained in the same manner as in Example 1 except that the amount of polyvinyl alcohol was set to 0.94 g.

Example 5

A positive electrode material made of a carbonaceous coated electrode active material was obtained in the same manner as in Example 1 except that the amount of polyvinyl alcohol was set to 0.65 g.

Example 6

A positive electrode material made of a carbonaceous coated electrode active material was obtained in the same manner as in Example 1 except that bead milling using zirconia beads was not carried out.

Example 7

A positive electrode material made of a carbonaceous coated electrode active material was obtained in the same manner as in Example 5 except that bead milling using zirconia beads was not carried out.

Comparative Example 1

A positive electrode material made of a carbonaceous coated electrode active material was obtained in the same manner as in Example 1 except that the atmosphere during the thermal treatment was set to nitrogen.

Comparative Example 2

A positive electrode material made of a carbonaceous coated electrode active material was obtained in the same manner as in Example 2 except that the atmosphere during the thermal treatment was set to nitrogen.

Comparative Example 3

A positive electrode material made of a carbonaceous coated electrode active material was obtained in the same manner as in Example 3 except that the atmosphere during the thermal treatment was set to nitrogen.

Comparative Example 4

A positive electrode material made of a carbonaceous coated electrode active material was obtained in the same manner as in Example 1 except that the amount of polyvinyl alcohol was set to 0.58 g.

Comparative Example 5

A positive electrode material made of a carbonaceous coated electrode active material was obtained in the same manner as in Example 1 except that the amount of polyvinyl alcohol was set to 1.5 g.

Characteristics of Positive Electrode Material

1. Measurement of Powder Resistance

The positive electrode material was put into a mold and pressurized at a pressure of 50 MPa to produce a molded body. The powder resistance value of the molded body was measured using a low resistivity meter [manufactured by Mitsubishi Chemical Analytech Co., Ltd., trade name: Loresta-GP] by four point measurements at 25° C.

2. Measurement of Specific Surface Area

The specific surface area of the positive electrode material was measured using a specific surface area meter [manufactured by Mountech Co., Ltd., trade name: HM model-1208] by the BET method through nitrogen ($N_2$) absorption.

3. Measurement of Amount of Carbon

The mass of the carbonaceous film was measured using a carbon/sulfur analyzer (manufactured by HORIBA, Ltd., trade name: EMIA-220V) and expressed as a percentage in the positive electrode material.

4. Thickness of Carbonaceous Film

The positive electrode material was photographed using a transmission electron microscope (TEM; manufactured by Hitachi High-Tech Corporation, Model No.: HF2000) at an accelerating voltage of 200 kV and a magnification of 200,000 times. In the obtained cross-sectional image, a 180 nm×180 nm visual field was observed at 10 arbitrary visual fields, the thickness of the carbonaceous film was measured at 100 points, and the average value thereof was regarded as the thickness of the carbonaceous film.

5. Mass of Carbonaceous Film Per Specific Surface Area

From the results of "2. Measurement of specific surface area" and "3. Measurement of amount of carbon", the amount of carbon per specific surface area ($mg/m^2$) (amount of carbon (g/g)/specific surface area ($m^2/g$)×1000) was calculated.

Production of Lithium Ion Batteries
Preparation of Positive Electrode

The positive electrode material obtained in each of the examples and the comparative examples, acetylene black (AB) as a conductive auxiliary agent, and a polyvinylidene fluoride (PVdF) resin as a binder were mixed into N-methyl pyrrolidinone (NMP) in a mass ratio of 90:5:5 (positive electrode material:AB:PVdF) to produce a positive electrode material paste. The obtained paste was applied onto a 30 μm-thick aluminum foil, dried, and then bonded by pressure with a roll calender at calender intervals of 30 μm to obtain an electrode plate.

Production of Battery

The obtained electrode plate was blanked to a circular piece having an area of 2 cm$^2$ with a circular punching machine and dried at 60° C. for 15 hours using a vacuum dryer, and then a coin cell of a lithium ion battery in which lithium was to be used for a negative electrode was produced in a glove box.

Evaluation of Lithium Ion Batteries
Evaluation of Low-Temperature Characteristics The obtained coin cell was charged at a 0.1 C rate at 25° C., and then the discharge capacity at the time of discharging the coin cell at 1 C at −30° C. was measured, thereby obtaining the discharge capacity at a low temperature. The results are shown in Table 1 and FIG. 1.

Figure 1:
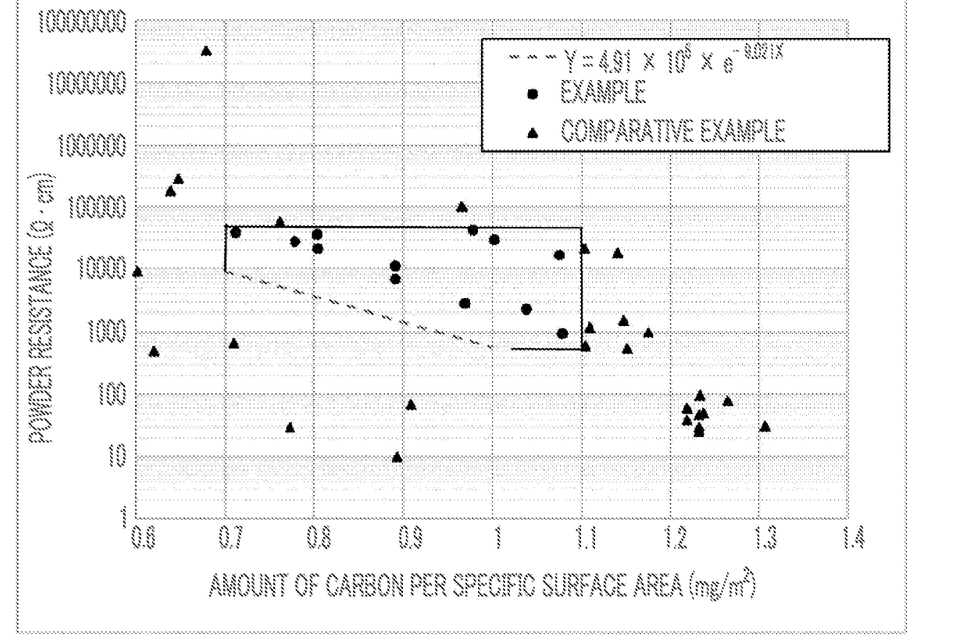
FIG. 1 is a graph in which the powder resistances with respect to the amount of carbon per unit specific surface area in positive electrode materials of Examples 1 to 7, Comparative Examples 1 to 5, and Experimental examples in which the amount of carbon or a manufacturing method such as a calcination atmosphere is changed are plotted.

FIG. 1 is a graph in which the powder resistances with respect to the amount of carbon per unit specific surface area in positive electrode materials of experimental examples in which Examples 1 to 7, Comparative Examples 1 to 5, the amount of carbon, or a manufacturing method such as a calcination atmosphere is changed are plotted. In FIG. 1, a region in which the powder resistance Y in Formula (1) is within a range of 500 Ω·cm or more and 50000 Ω·cm or less and the mass X of the carbonaceous film per unit specific surface area is within a range of 0.7 mg/m$^2$ or more and 1.1 mg/m$^2$ or less is indicated by solid lines, and a straight line represented by "Y=4.91×10$^6$× e$^{-9.021X}$" that is derived from Formula (1) is indicated by a broken line.

TABLE 1

| | Powder resistance [Y in Formula (1)] (Ω·cm) | Specific surface area (m$^2$/g) | Amount of carbon (% by mass) | Thickness of carbonaceous film (nm) | Mass of carbonaceous film per specific surface area [X in Formula (1)] (mg/m$^2$) | Right-hand side of Formula (1) | Capacity at −30° C. (mAh/g) |
|---|---|---|---|---|---|---|---|
| Example 1 | 36530 | 16.2 | 1.30 | 2 | 0.80 | 3478 | 85 |
| Example 2 | 11150 | 18.3 | 1.63 | 3 | 0.89 | 1588 | 84 |
| Example 3 | 2779 | 19.3 | 1.87 | 4 | 0.97 | 785 | 80 |
| Example 4 | 971 | 19.6 | 2.12 | 5 | 1.08 | 292 | 88 |
| Example 5 | 38720 | 14.3 | 1.02 | 2 | 0.71 | 8024 | 82 |
| Example 6 | 17020 | 13.0 | 1.39 | 2 | 1.08 | 300 | 81 |
| Example 7 | 42840 | 11.1 | 1.08 | 1 | 0.98 | 727 | 82 |
| Comparative Example 1 | 508 | 12.9 | 0.80 | 0.4 | 0.62 | 18258 | 60 |
| Comparative Example 2 | 675 | 15.5 | 1.10 | 1 | 0.71 | 8142 | 65 |
| Comparative Example 3 | 31 | 17.6 | 2.30 | 6 | 1.31 | 37 | 62 |
| Comparative Example 4 | 181900 | 15.7 | 1.00 | 2 | 0.64 | 15464 | 42 |
| Comparative Example 5 | 94 | 24.1 | 2.88 | 11 | 1.20 | 102 | 54 |

As is clear from Table 1, in all of Comparative Example 1 in which the powder resistance was within a range of 500 Ω·cm or more and 50000 Ω·cm or less, but the mass of the carbonaceous film per unit specific surface area was less than 0.7 mg/m$^2$; Comparative Example 2 in which the powder resistance and the mass of the carbonaceous film per unit specific surface area were within the scope of the present invention, but Formula (1) was not satisfied; Comparative example 4 in which the magnitude relation of Formula (1) was satisfied, but the powder resistance and the mass of the carbonaceous film per unit specific surface area failed to satisfy the scope of the present invention; and Comparative Examples 3 and 5 in which the powder resistance and the mass of the carbonaceous film per unit specific surface area were not within the scope of the present invention and, furthermore, Formula (1) was not satisfied, the capacity at −30° C. was 65 mAh/g or less, and the output characteristics at low temperatures were not excellent. In contrast, in all of the lithium ion batteries for which the positive electrode material of the example was used, the capacity at −30° C. became 80 mAh/g or more, and the output characteristics at low temperatures were excellent.

What is claimed is:

1. A positive electrode material for a lithium ion battery comprising:
    primary particles each coated with a carbonaceous film, or
    agglomerates of primary particles, each primary particle being coated with a carbonaceous film, or
    primary particles each coated with a carbonaceous film and agglomerates of primary particles, each primary particle being coated with a carbonaceous film,
    wherein
    a powder resistance is 500 Ω·cm or more and 50000 Ω·cm or less,
    a mass of the carbonaceous film per unit specific surface area is 0.7 mg/m$^2$ or more and 1.1 mg/m$^2$ or less, and
    Formula (1) is satisfied, $$Y \geq 4.91 \times 10^6 \times e^{-9.021X} \quad (1)$$

Y: powder resistance (Ω·cm)
X: mass of carbonaceous film per unit specific surface area (mg/m$^2$).

2. The positive electrode material for a lithium ion battery according to claim 1, wherein a main component of the carbonaceous film is consisted of hard carbon.

3. The positive electrode material for a lithium ion battery according to claim 1, wherein a thickness of the carbonaceous film is 0.5 nm or more and 10 nm or less.

4. A positive electrode for a lithium ion battery, comprising the positive electrode material for a lithium ion battery according to claim 1.

5. A lithium ion battery comprising:
    the positive electrode for a lithium ion battery according to claim 4.

* * * * *